July 3, 1951

A. STALDER 2,559,378

MACHINE FOR THE MANUFACTURE OF
SMALL FLOOR-PARQUETING BLOCKS

Filed May 2, 1947

INVENTOR:
Adolf Stalder
BY
Richard J Geier
ATTORNEYS

INVENTOR:
Adolf Stalder
By
Richard y Geier
ATTORNEYS

July 3, 1951
A. STALDER
2,559,378
MACHINE FOR THE MANUFACTURE OF
SMALL FLOOR-PARQUETING BLOCKS
Filed May 2, 1947
4 Sheets-Sheet 3
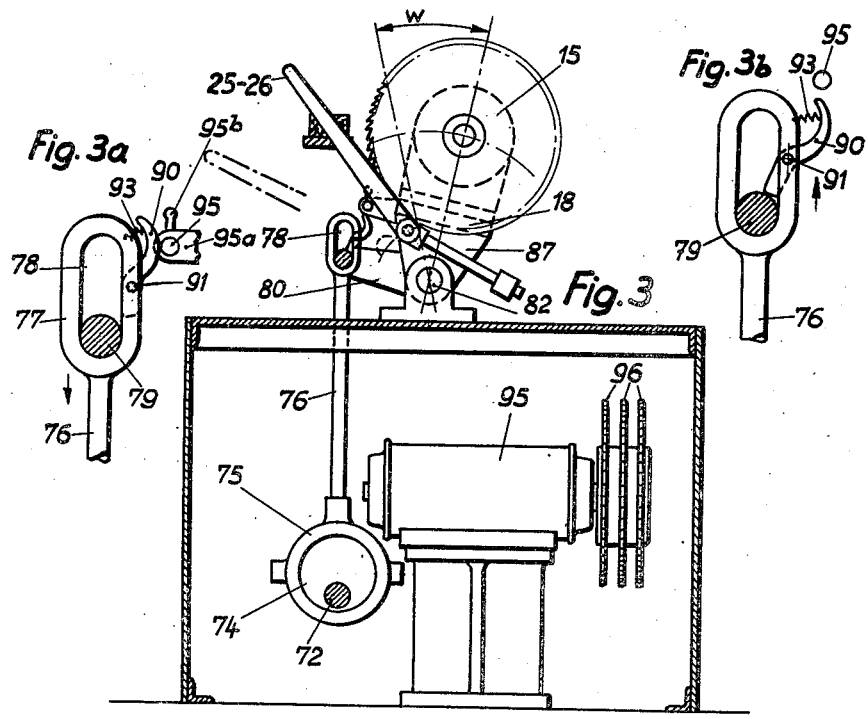
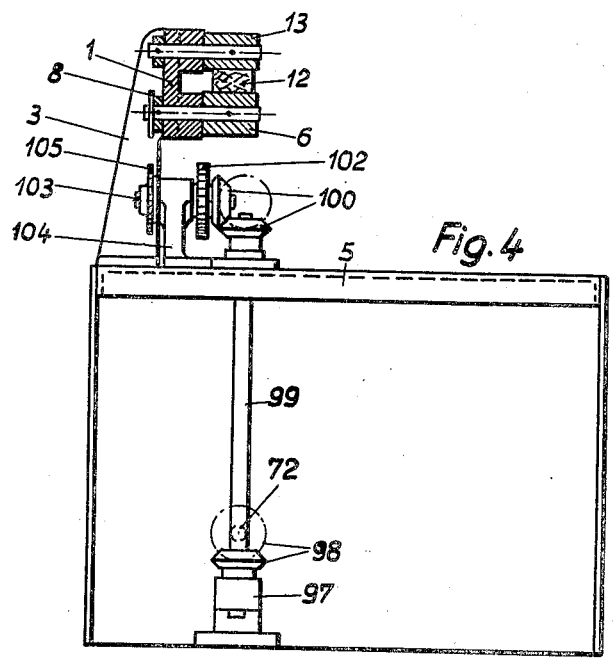
INVENTOR:
Adolf Stalder
BY
Richardy Geier
ATTORNEYS

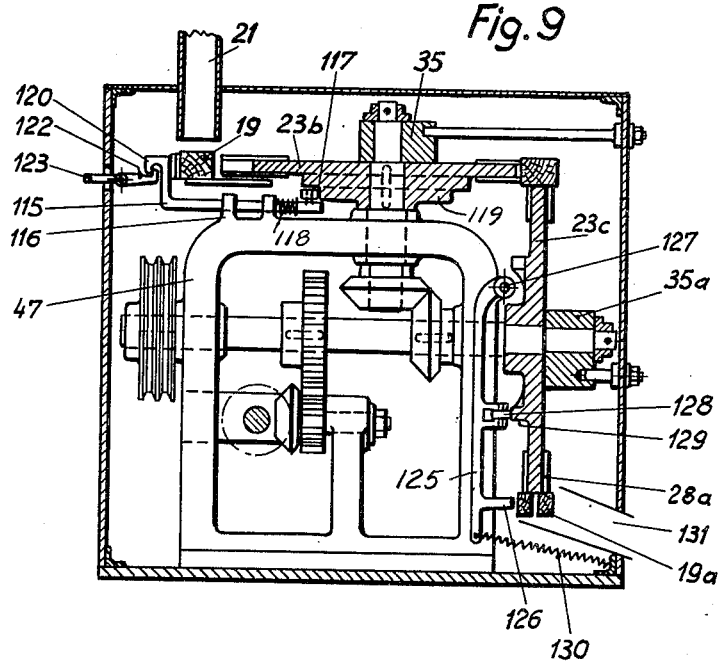
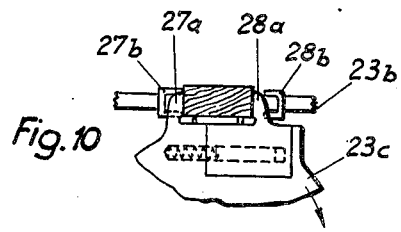
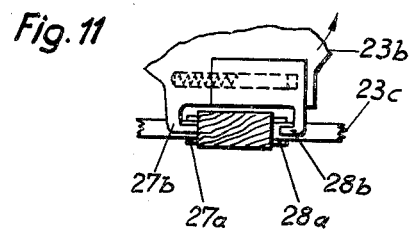

Patented July 3, 1951

2,559,378

UNITED STATES PATENT OFFICE 2,559,378

MACHINE FOR THE MANUFACTURE OF SMALL FLOOR-PARQUETING BLOCKS

Adolf Stalder, Eschlikon, Switzerland

Application May 2, 1947, Serial No. 745,521
In Switzerland May 3, 1946

2 Claims. (Cl. 143—38)

For the assembly of floors composed of small parqueting strips or blocks very large numbers of such strips are required, so that the production of floors from small-size parqueting blocks is economically justifiable only if and when the necessary blocks can be manufactured with a maximum of accuracy and at the same time cheaply on automatic machines.

The object of the present invention is to create an efficient machine by means of which small floor-parqueting blocks can be manufactured with absolute accuracy and in very large quantities.

The machine in accordance with the invention is characterized by the fact that for machining the length, width and thickness of the small floor-parqueting blocks at least two saws or dividing saws in each case, said two saws being disposed at the requisite distance each from the other, are used, whereby at least one pair of dividing saws cuts off the blocks to exact length from a lath or slat whose cross-section is greater than that of the finished block, whereupon a holding device performing a circling movement seizes the piece so cut off and guides it in between two saws, so that two parallel sides of the block are simultaneously machined exactly to size, the holding device then by suitable means relinquishing the block to a second rotating holding device, the latter being set in a plane forming an angle with the plane of the first holding device, which second holding device guides the block in between at least two further saws which machine the remaining two parallel sides of the block to exact size. The blocks can suitably be guided by the second holding device between two saws and a dividing saw in such manner that the blocks can be cut into two equal blocks or strips of half the original thickness. As bearing surfaces circular saws can be used which cut not only at their front edge, but also laterally.

The annexed drawing illustrates two typical embodiments of the machine in accordance with the invention, in which:

Fig. 3 is a vertical section along the line III—III of Fig. 1;

Figs. 3a and 3b show the head of the connecting rod for the operation of the see-saw or oscillating device on which is mounted the motor with the dividing saw for cutting the pieces off the lath;

Fig. 4 is a vertical cross-section along the line IV—IV of Fig. 1;

Fig. 9 is a section similar to the section along line I—I in Fig. 1, but represents an alternative embodiment in which the piece of work is moved automatically from one machining point to the other;

Fig. 10 is a partial view of the two work-holding or chuck plates, whose respective planes stand at an angle each to the other, at the moment of transfer of the piece of work from the horizontal to the vertical work-holding plate;

Fig. 11 a view in plan of Fig. 10.

Figure 1:
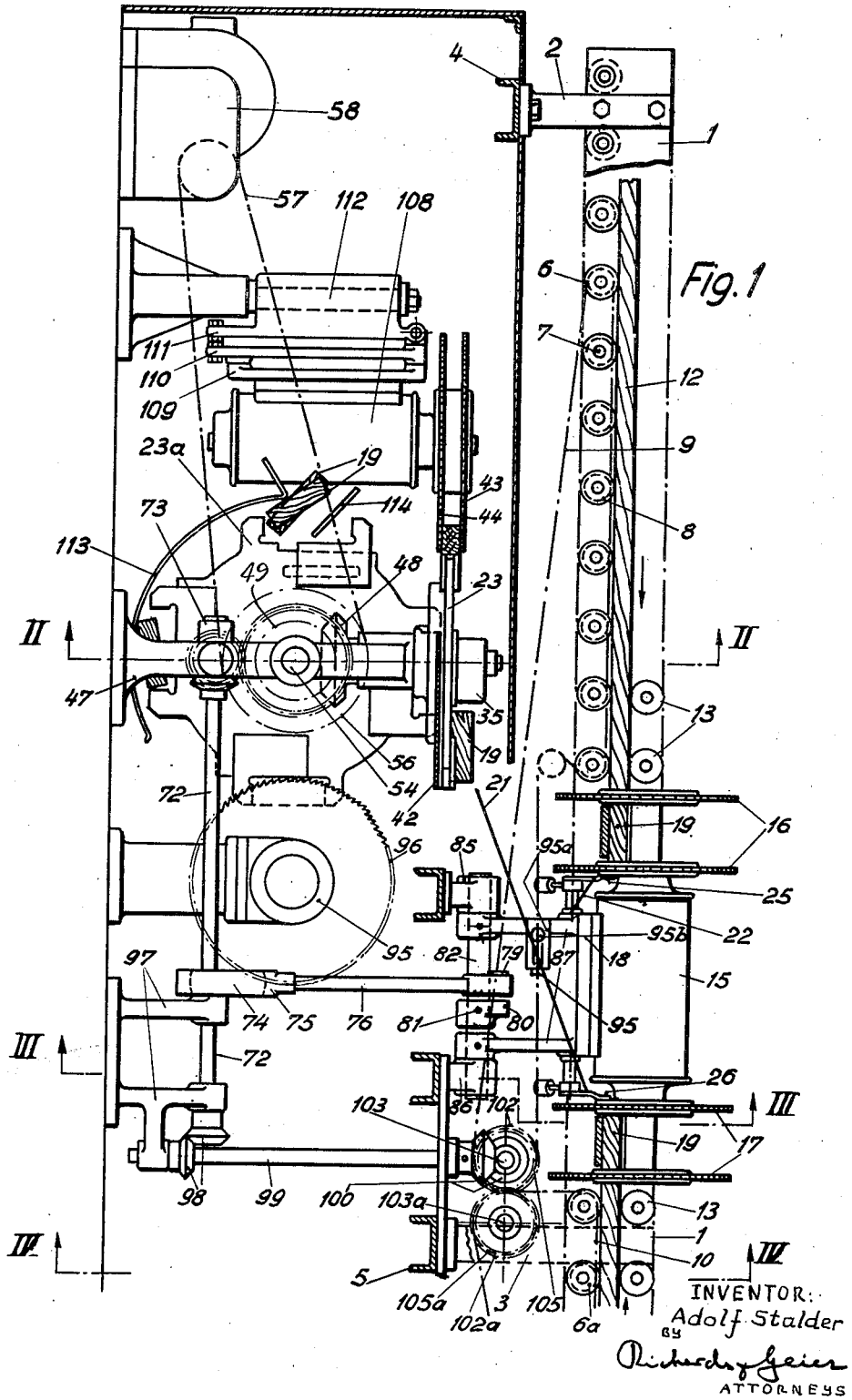
Fig. 1 is the front elevation of the machine with the front cover removed to reveal the internal mechanism.
Figure 2:
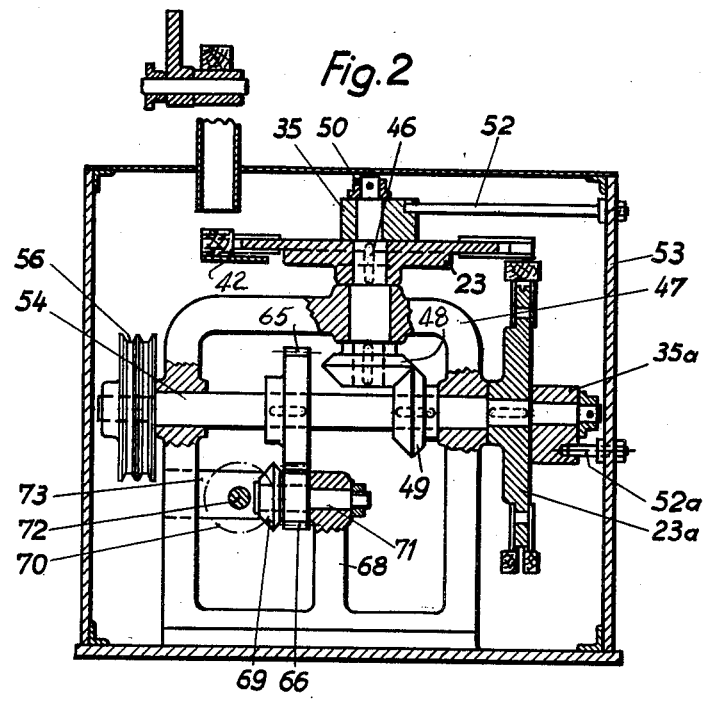
Fig. 2 is a vertical section along the line II—II of Fig. 1.
Figures 5, 6:
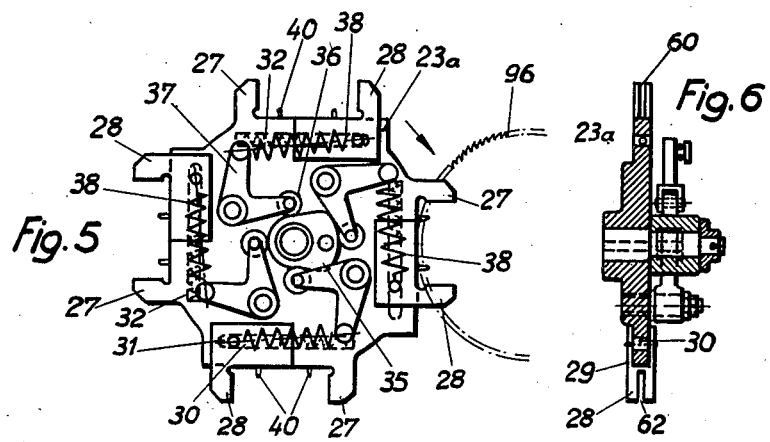
Fig. 5 is a view in plan of one of the work-holding plates.
Fig. 6 is a section through the work-holding or chuck plate on the vertical center line of Fig. 5.
Figure 7:
Fig. 7 shows a pair of saws.
Figure 8:
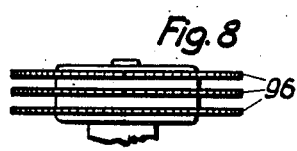
Fig. 8 shows three saws arranged side by side, the middle saw serving as a dividing saw.

Conveyor rollers 6 secured to shafts 7 are mounted on the rail 1 which is secured by brackets 2 and 3 to the transverse channels 4 and 5. On the other side of the rail 1, chain sprockets 8 are secured to the shafts 7, with which sprockets the chains 9 and 10 engage. By means of the rollers 13 the laths are pressed downwards against the rollers 6 which carry the laths 12 in the directions indicated by the arrows. Dividing saws 16 and 17 are mounted on the motor 15, which is provided with two shaft-ends. The motor 15 is mounted on a see-saw or oscillating device 18 (Fig. 3) and is, as will be described presently, moved backwards and forwards. In the course of this reciprocal or oscillating movement the dividing saws 16 and 17 cut off pieces 19 from the lath, which pieces then pass via the chutes 21 and 22 to the chuck plate 23. When the dividing saws have been pivoted to their rear position, the rollers 6 and 13 feed the piece of wood forward up to the stops 25 and 26. The stops 25 and 26 are adjusted in such manner that the fore end of the lath or slat 12 is also cut, in order to ensure that the length of the cut-off blocks 19 exactly corresponds to the distance between the dividing saws 16 and 17. If, for instance, a knot or other defective portion exists in the lath 12, the stop 25 can, as shown in Fig. 3, be lowered so that the faulty piece is cut off by the innermost of the two dividing saws 16 and 17. The piece so cut off can then be seized and discarded by hand, or can be conveyed to the scrap heap by suitable means. The planes of the chuck plates 23 and 23a, Fig. 2, form an angle each with the other. The clamping devices provided on both chuck plates are approximately similar each to the other. Fig. 5 shows the chuck plate 23a in elevation and Fig. 6 shows it in section. Said chuck plate is provided with four fixed jaws in relation to which four movable jaws 28 are displaceably disposed. One jaw 27 and one jaw 28 form together a holder or chuck for the piece of work. Jaw 28, whose flanges 29 project over the chuck plate 23a, is guided by an intermediate member 30 in a slot 31 of the chuck plates 23 and 23a. By means of a compression spring 32 the jaws 28 are propelled away from the jaws 27, with the result that the chucking throat opens. To close said chucking throat a cam 35 is provided on which ride the rollers 36 of the angle levers 37. To the other arm of the lever is fastened a spring 38 which is connected to the jaw 28. The gripping effect between jaws 27 and 28 therefore takes place as a result of the tension exerted by the spring 38. The dowels 40 serve to support the work, so as to prevent the latter from coming to rest on sawdust or other surface irregularities. Under the chuck plate 23 a metal sheet 42 is disposed, as shown in Figs. 1 and 2, on which the work 19 lies after sliding down the chute 21 and coming to rest in a position within one of the chuck throats. The work 19, clamped fast by the tension of the springs 38, is guided in between the saws 43 and 44 and cut exactly to the required thickness. The chuck plate 23 is keyed on to the vertical shaft 46, Fig. 2, which is journalled in the supporting frame 47. To the lower end of the shaft 46 is keyed the bevel gear wheel 48, said bevel gear wheel 48 standing in engagement with bevel gear wheel 49. The cam 35, which is so disposed as to be freely rotatable on the shaft 46 and is axially held by the thrust collar 50, is prevented from turning by the rod 52, which latter is secured to the side wall 53 of the machine. The shaft 54, horizontally journalled in the supporting frame 47 and carrying the bevel gear wheel 49, is driven by the V-belt pulley 56, which is transmissionally connected by the V-belt 57 to the reduction gear 58, Fig. 1. On shaft 54 is located the chuck plate 23a, which rotates in a plane standing in angular relationship to that of chuck plate 23. Chuck plate 23a is designed as an exact copy of chuck plate 23 with the exception that chuck plate 23a possesses a slot 60 which enables two circular saws, and between the latter a dividing saw, to be used, as shown in Fig. 8. The gripper jaws 27 and 28 are likewise provided with a slot 62. This arrangement makes it possible not merely to machine the work transferred to chuck plate 23 on its two hitherto unmachined surfaces, but also and at the same time to subdivide it in two pieces. Clamping jaws 27 and 28 are controlled on chuck plate 23a by the cam 35a, which is held against turning by the bolt 52a. On shaft 54 is further located a spur gear 65 with which the spur gear 66 engages, the latter being half the size of spur gear 65. Spur gear 66 turns on stay-bolt 71, which is fixed in the arm 68 of the supporting frame or pedestal 47. Connected to spur gear 66 is a bevel gear wheel 69 which engages with bevel gear wheel 70, the latter being secured to shaft 72. Shaft 72 is journalled in the bearing arm 73. On shaft 72 is located an eccentric cam 74, Figs. 1 and 3, on which collar or ring 75 is rotatably secured. Ring or collar 75 is connected to a connecting rod 76 provided with an elongated eye 77 (Fig. 3a) with a slot 78. The bolt 79 of the lever arm 80 is able to slide in said slot 78, said lever arm being secured to shaft 82 by means of the cotter pin 81 (Fig. 1). Shaft 82 is journalled in the bearings 85 and 86. On shaft 82 is further located the see-saw or oscillating device 18, by means of its bearing arms 87. Connecting rod 76 is provided with a pawl 90 pivotally disposed on the fulcrum pin 91. This pawl 90 can be pivoted from the position shown in Fig. 3b to the position shown in Fig. 3a, so that bolt 79 is movable within the slot 78. The pawl 90 is forced by spring 93 into the locking position shown in Fig. 3b, with the result that the bolt 79 is carried along by the rod 76 in the direction indicated by the arrow. On rotation of the eccentric cam 74 the see-saw or oscillating device 18, and with the latter the motor 15 together with the pairs 16 and 17 of dividing saws, are pivoted through the angle w (Fig. 3). If it is desired to interrupt the pivotal movement of the dividing saws, the stop 95, which is displaceably located in the eye 95a, is moved to a point within the range of action of the pawl 90, this forcing the lower portion of the pawl 90 outside the range of action of the bolt 79, so that the latter becomes movable within the slot 78 and thus does not operate the see-saw or oscillating device.

Fig. 3 further shows the motor 95, on whose shaft the two saws 96, and the dividing saw disposed between them, are located, said saws serving to machine and subdivide the blocks of wood held in the chuck plate 23a.

Figs. 1 and 4 show how, by shaft 72, the right-hand end of which is journalled in the pedestal 97, and via the bevel gear wheels 98, the vertical shaft 99 is driven, which, through the bevel gear wheels 100, drives the spur gear 102 which is located on the shaft 103, said shaft 103 being journalled in the pedestal 104, Fig. 4. On shaft 103 is further located the chain sprocket wheel 105 which, through the chain 9, Fig. 1, drives the sprocket wheels 8 and consequently the rollers 6, which rollers 6 feed forward the lath which, by means of the counter-rollers 13, is pressed downwards upon the feed rollers 6. For the drive of the rollers 6a by the chain 10 a second shaft 103a is journalled in the pedestal 104, said shaft 103a being driven by the spur gear 102a which engages with the spur gear 102; on said shaft 103a is located the chain sprocket 105a which drives the chain 10. The drive of the two saws 43 and 44 is provided for, as shown in Fig. 1, by the motor 108. The said motor 108 is pivotally disposed on the bolt 112 by means of intermediate members 109, 110 and 111, so that replacement of the saws can be effected at any time without it being necessary to remove the chuck plate 23.

With the machine described in accordance with Figs. 1 to 8 the work is guided by gravity feed, if necessary in conjunction with pressure air, from one machining point to the other, and is, as is shown in Fig. 1, discharged from the machine by means of guide plates 113 and 114.

Figs. 9, 10 and 11 illustrate an alternative embodiment of the machine. The feed of the blocks of wood from the channel 21 to the chuck plate 23b takes place automatically by means of the pusher 115, which is carried in the eyes 116 of the supporting frame 47 and whose roller 117 is pressed by the spring 118 against the eccentric cam 119 of the chuck plate 23b. The pusher 115 is provided with a hook 120 which engages with the pawl 122, said pawl being able to be tripped by the lever 123. The pusher 115 can in this manner be switched out of operation, so that the feeding of the blocks of wood towards the chuck plate 23b is suspended. The chuck plates 23b and 23c differ from the chuck plates 23 and 23a in the fact that the clamping jaws 27a and 28a of chuck plate 23c, and the clamping jaws 27b and 28b of chuck plate 23b, as shown in Figs. 10 and 11, are so shaped that they can mutually engage. By suitably designing the shape of the eccentric cams 35 and 35a it is possible to close the clamping jaws of chuck plate 23c before the clamping jaws of the chuck plate 23b have released the work, so that the piece of wood is automatically transferred from chuck plate 23b to chuck plate 23c. The ejection of the finished blocks of wood is effected by the ejector lever 125, which is provided with a projection 126. The lever 125 pivots on a fulcrum pin 127 which is secured to the supporting frame 47; the said lever 125 is provided with a roller 128 which rides on the eccentric cam 129 of the chuck plate 23c and is pulled by the spring 130 towards the eccentric cam 129. Simultaneously with the opening of the clamping jaws 28a, and when the cam 129 is moved out of the way the lever 125 is swung by the spring 130 and the projection 126 is caused to strike against the block of wood 19a, with the result that the latter is discharged through the channel 131.

I claim:

1. In a machine for the manufacture of small floor-parqueting blocks; two chuck plates for treating the blocks in two positions extending at right angles to each other and having an interchanging position for the transfer of blocks from one chuck plate to the other, each chuck plate comprising a rotary disc, each disc having a plurality of fixed jaws firmly connected therewith and protruding therefrom, a movable jaw for each fixed jaw coacting to form a jaw pair, and spring means urging one movable jaw toward the corresponding fixed jaw of the pair; means rotating one of the discs in a horizontal plane and the second disc in a plane at 90° to the plane of the first disc with a jaw pair of the second disc below and close to a jaw pair of the first disc at said interchanging position, cam means for the first disc moving the movable jaw of the jaw pair in said interchanging position away from the fixed jaw of that pair against the action of the spring means to release a block held by the jaw pair, and cam means to close the jaws of the jaw pair of the second disc in said interchanging position upon receipt of the block released by the jaw pair of the first disc.

2. In a machine for the manufacture of small floor-parqueting blocks according to claim 1 in which each coacting jaw pair of the second disc is characterized by having a transverse slot formed in the outer ends thereof, the slot extending inwardly toward the body of the disc, and a saw fitting into said slot to cut in half the blocks held by the jaw pairs of the second disc.

ADOLF STALDER.

REFERENCES CITED

The following references are of record in the file of this patent:

UNITED STATES PATENTS

| Number | Name | Date |
|---|---|---|
| 254,202 | Euston | Feb. 28, 1882 |
| 384,786 | Rehfuss | June 19, 1888 |
| 766,403 | Vincke | Aug. 2, 1904 |
| 980,147 | Froslid | Dec. 27, 1910 |
| 1,091,772 | Sherman | Mar. 31, 1914 |
| 1,322,528 | Brokaw et al. | Nov. 25, 1919 |
| 2,078,177 | Hickman | Apr. 20, 1937 |
| 2,427,712 | Casler et al. | Sept. 23, 1947 |

FOREIGN PATENTS

| Number | Country | Date |
|---|---|---|
| 2,457 | Great Britain | Aug. 17, 1872 |